Jan. 16, 1923.
J. H. PEARSON.
SILO DOOR.
FILED MAY 18, 1920.
1,442,699
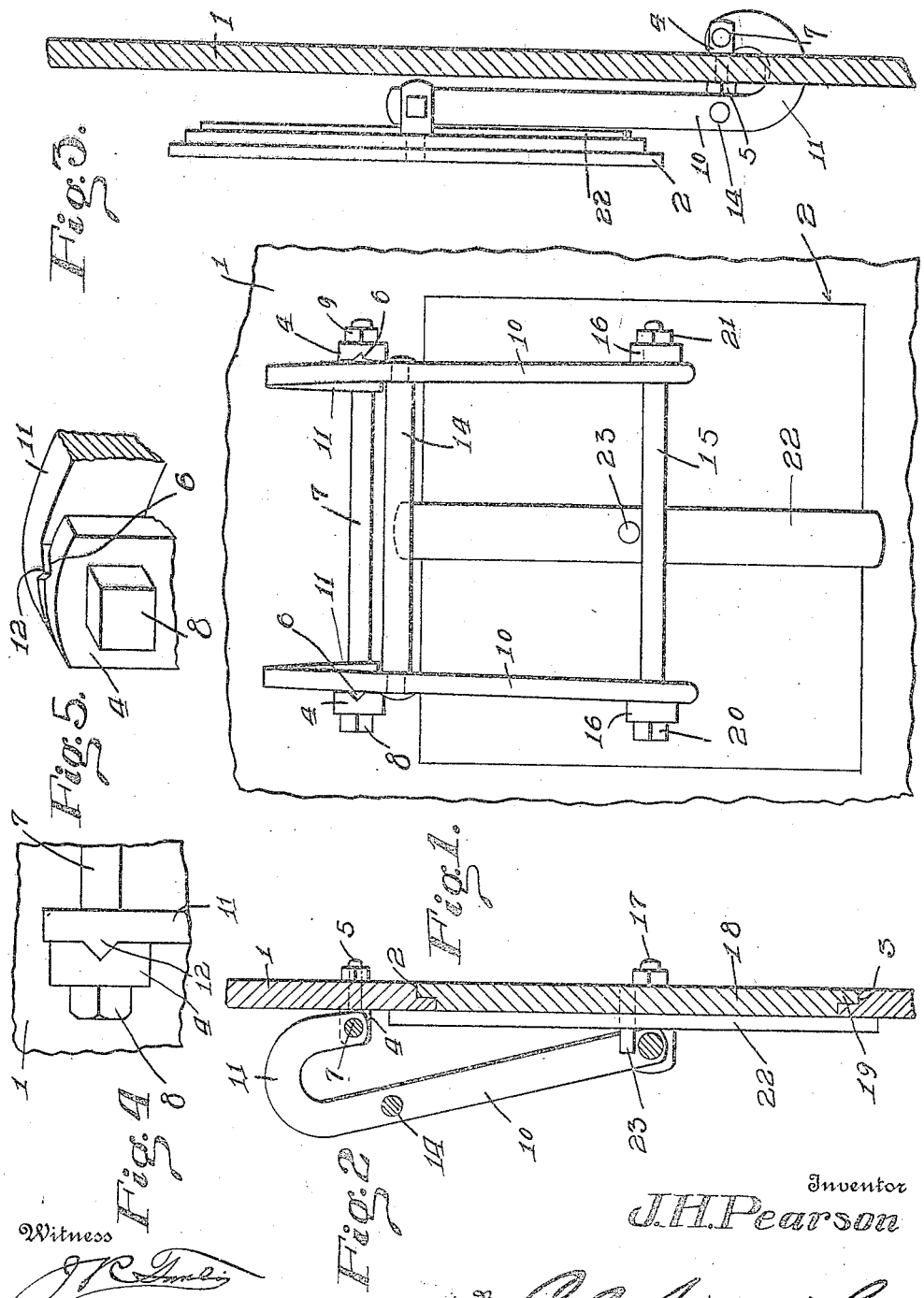
Inventor
J.H.Pearson
By
Attorneys
Witness Patented Jan. 16, 1923.

1,442,699

UNITED STATES PATENT OFFICE.

JAMES H. PEARSON, OF BLOOMFIELD, INDIANA, ASSIGNOR TO GLENN V. GLADVILLE, OF BLOOMFIELD, INDIANA.

SILO DOOR.

Application filed May 18, 1920. Serial No. 382,232.

*To all whom it may concern:*

Be it known that I, JAMES H. PEARSON, a citizen of the United States, residing at Bloomfield, in the county of Greene and State of Indiana, have invented a new and useful Silo Door, of which the following is a specification.

It is the object of this invention to provide a novel means for mounting a door on a silo.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in front elevation, a portion of a silo, whereunto the device forming the subject matter of this application has been applied; Figure 2 is a vertical section taken through a portion of a silo equipped with the device hereinafter described and claimed, the door being closed; Figure 3 is a vertical section taken through a portion of a silo equipped with the device hereinafter described and claimed, the door being open; Figure 4 is an elevation showing the relations existing between sundry parts when the door is open; and Figure 5 is a fragmental perspective disclosing the interengaging elements on the suspension members and on the bearings.

The numeral 1 marks part of a silo having a doorway 2 provided with an edge recess 3. Bearings 4 are located above the doorway 2 and are secured as indicated at 5 to the silo 1. The adjacent vertical inner faces of the bearings 4 are provided with notches 6. A pivot rod 7 is mounted in the bearings 4. The pivot rod is prevented from moving endwise by a head 8 on one end of the rod, engaging one of the bearings 4 and by a nut on the other end of the rod, engaging the other of the bearings and designated by the numeral 9.

A pair of suspension members 10 is provided. The suspension members 10 have curved upper ends 11 disposed between the bearings 4 in contact therewith, the said ends being mounted to swing on the rod 7. The ends 11 of the suspension members 10 have lugs 12 adapted to be engaged in the notches 6 of the bearings 4. The curved ends 11 of the suspension members 10 are resilient, so that the lugs 12 can spring into and out of the notches 6. Intermediate their ends, the suspension members 10 are connected by a rod 14. The lower ends of the suspension members 10 are connected by a rod 15 mounted to turn in bearings 16 secured as indicated at 17 to a door 18 adapted to cooperate with the doorway 2 and provided with a flange 19 adapted to be received in the recess 3. The rod 15 has a head 20 on one end and a nut 21 on the other end, the head and the nut cooperating with the respective bearings 16 to prevent the rod from moving endwise. Any suitable means may be provided for holding the door 18 positively in a closed position. If desired, a button 22 may be united to the door 18 by a pivot element 23 for the purpose last above alluded to.

The door 18 may be swung inwardly and upwardly within the silo 1 as shown in figure 3 leaving the doorway 3 practically unencumbered. The suspension members 10 are provided with curved ends 11 for two purposes: first, to receive the wall of the silo 1 at the upper edge of the doorway 2, when the door 18 is swung upwardly and inwardly as shown in Figure 3; and, secondly, to space the rod 14 far enough from the outer surface of the silo 1, when the door is closed, as shown in Figure 2, so that the said rod may serve as one rung of a ladder. When the door 18 is swung into an open position as shown in Figure 3, the lugs 12 on the ends 11 of the suspension members 10 enter the notches 6 and hold the door 18 in an open position. When, however, the door 18 is closed, the lugs 12 ride out of the notches 6 on the inner surfaces of the bearings, the ends 11 of the suspension members springing inwardly as shown in Figure 1.

Having thus described the invention, what is claimed is:—

In a device of the class described, a building having a doorway: a door for the doorway; bearings on the building; a first rod extended between the bearings; supporting members each having a curved resilient end, the said resilient ends of the supporting members and the bearings having interengaging elements which coact to hold the door in an open position, the supporting members being connected pivotally with the door, the said ends of the supporting members being mounted pivotally on the rod to permit the door to open and to close, and being slidable on the rod, longitudinally thereof, to permit said interengaging elements to move into and out of cooperating relation; a second rod connecting the supporting members, and located closely adjacent to the said resilient ends of the supporting members and closely adjacent to the first rod, but outwardly thereof whereby the second rod will tend to stiffen the said ends of the supporting members and to enhance the hold of the interengaging elements upon each other, and whereby, when pressure is exerted upon the second rod, the pressure will have an appreciable component tending to open the door, should the door be stuck.

In testimony that I claim the foregoing as my own, I have hereto affixed my signature in the presence of two witnesses.

JAMES H. PEARSON.

Witnesses:
 ARRIE FREELAND,
 JACK CATRON.